United States Patent [19]

Lopes et al.

[11] 4,208,882
[45] Jun. 24, 1980

[54] START-UP ATTEMPERATOR

[75] Inventors: William F. Lopes, North Reading; William G. Carberg, Georgetown, both of Mass.

[73] Assignee: General Electric Company, Schenectady, N.Y.

[21] Appl. No.: 860,721

[22] Filed: Dec. 15, 1977

[51] Int. Cl.² ............................................. F01K 7/34
[52] U.S. Cl. ........................................ 60/653; 60/660; 122/479 R
[58] Field of Search ............... 60/39.18 B, 646, 653, 60/656, 657, 660, 665, 667, 666; 122/479 R

[56] References Cited

U.S. PATENT DOCUMENTS

| 3,286,466 | 11/1966 | Stevens | 60/656 |
| 3,392,712 | 7/1968 | Lustenader et al. | 122/459 |
| 3,496,724 | 2/1970 | Wilson | 60/646 |

FOREIGN PATENT DOCUMENTS 1008553 10/1965 United Kingdom .
1051977 12/1966 United Kingdom .
1072051 6/1967 United Kingdom .

Primary Examiner—Allen M. Ostrager
Assistant Examiner—Stephen F. Husar
Attorney, Agent, or Firm—James W. Mitchell; John F. Ahern

[57] ABSTRACT

In a combined cycle power plant comprising a steam turbine and gas turbine connected through a heat recovery steam generator, the start-up mode for a steam turbine is based upon the shell metal temperature of the steam turbine. In some combined cycle plants, the output of the gas turbine is reduced so as to more closely match the output steam temperature of the heat recovery steam generator to the steam turbine metal temperature. This arrangement can be disadvantageous for several reasons and so it is proposed that a spray attemperator or desuperheater be incorporated between the heat recovery steam generator outlet and the steam turbine inlet. Moreover, control means are indicated for controlling the fluid input into the attemperator.

3 Claims, 5 Drawing Figures

START-UP ATTEMPERATOR

BACKGROUND OF THE INVENTION

This invention relates to power plants utilizing at least one steam turbine and one gas turbine in combination with a heat recovery steam generator (HRSG) and in particular, relates to a means for controlling the temperature of the steam output of the HRSG into the steam turbine independently of the gas turbine operation.

Steam turbine start-up philosophy calls for minimizing temperature differences between steam temperature and steam turbine metal temperature to reduce the potential for steam turbine thermal cyclic damage. Therefore, combined cycle plant start-up modes are dictated by steam turbine metal temperature. When the steam turbine metal temperature is close to the maximum steam temperature able to be generated, no restrictions are imposed upon the gas turbine start-up and loading. When the steam turbine metal temperature is moderately or much colder than the maximum steam temperature able to be generated, then restrictions are imposed upon the gas turbine loading. When gas turbine loading is restricted, a lower gas turbine exhaust gas temperature results with a correspondingly lower steam temperature and steam flow being generated by the HRSG. Past combined cycle steam turbine sizes have not required, for start-up and initial loading, steam flows in excess of that produced by one gas turbine HRSG package; however, with larger steam turbines being used it now appears that if the current practice of restricting the load on the gas turbine is maintained, then two, rather than one, gas turbine HRSG packages will be required to generate ample steam flow to roll-off and initially load the larger steam turbines.

An alternate solution would be to employ a start-up attemperator in the main steam line adjacent to the HRSG steam header. The use of a steam desuperheater would obviate the restrictions on gas turbine loading along with associated systems complications. Steam flow generation could then be brought to maximum temperature and flow for the gas turbine/HRSG package thereby providing sufficient steam flow for steam turbine roll-off.

The addition of a start-up attemperator could be used to allow optimum design of the HRSG superheater to take place within the bounds of economic evaluation factors with the excess steam temperature reduced or shaved by the attemperator to values consistent with acceptable steam turbine operation. Plant usage as a temperature shaving device would be very remote requiring an ambient temperature extreme and gas turbine operation at peak. This condition conceivably might never happen in the life of the plant, but, however the plant must be designed for that eventuality.

OBJECTIVES OF THE INVENTION

It is one objective of the invention to provide a steam temperature control for a combined cycle plant whereby HRSG steam output temperature is controlled while the gas turbine is under full load.

It is another object of the present invention to provide a means for independently regulating the steam temperature of input steam into a steam turbine in a combined cycle plant.

It is another object of the invention to provide a desuperheating station between a HRSG and steam turbine whereby optimum design may be achieved in the superheater.

It is another object of the invention to provide a desuperheating station between a HRSG and steam turbine whereby the highest temperature level of HRSG steam output may be controlled.

The novel features believed characteristic of the present invention are set forth in the appended claims. The invention itself, however, together with further objects and advantages thereof, may best be understood with reference to the following description taken in connection with the appended drawings.

BRIEF DESCRIPTION OF THE INVENTION

One aspect of the present invention is embodied in a desuperheating station located immediately downstream of the HRSG superheater outlet. The desuperheating station includes a spray type steam attemperator and associated valve hardware. In combination with the valve hardware there are certain controls automatically operating the valve hardware. The controls are regulated by logic circuits and analog circuits which will become apparent during the detailed description of this invention. However, in brief form, temperature measurements are taken downstream of the attemperator as a feedback signal to be compared with a reference temperature setpoint. The reference temperature setpoint is initially determined by the starting temperature of the steam turbine metal and thereafter is ramped according to logic to be described. Ultimately a control valve is opened according to the desired temperature setpoint until the turbine shell metal temperature reaches a temperature beyond which it is automatically matched by the design capacity of the HRSG.

DETAILED DESCRIPTION OF THE DRAWINGS

Figure 1:
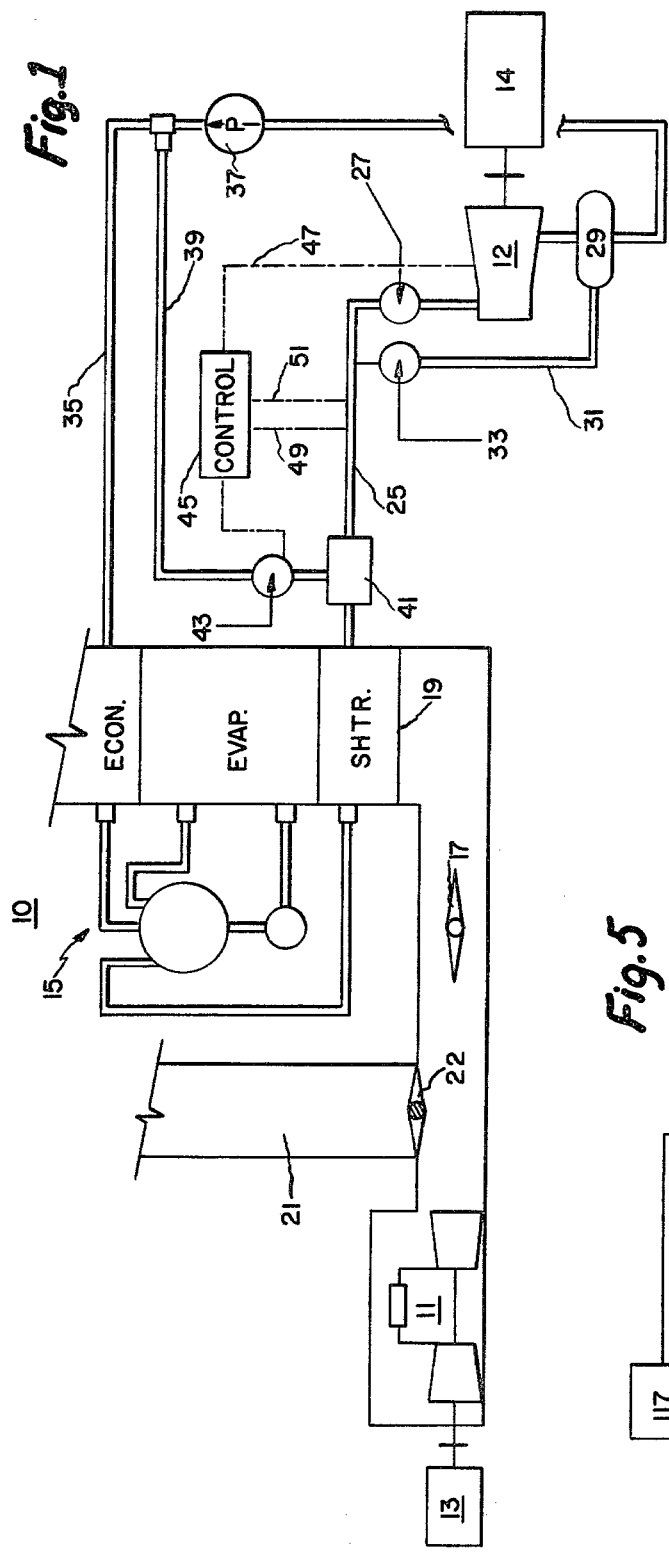
FIG. 1 is an outline drawing of a combined cycle power plant and includes a schematic drawing of a desuperheating station or start-up attemperator according to the present invention.

FIG. 1 is an outline drawing of a combined cycle power plant 10 which includes a gas turbine 11 driving an electrical generator 13 and a steam turbine 12 driving an electrical generator 14. The exhaust gas flow from the gas turbine is channeled through a heat recovery steam generator 15 through an isolation damper 17 and into a stack 19. The HRSG stack is comprised of several sections which may include a superheater, and evaporator, and an economizer. Alternatively, the exhaust output of the gas turbine may be channeled into a bypass stack 21 by appropriately positioning a damper 22.

The output from the superheater is input into a main steam header 25 which carries the steam to the steam turbine 12 through appropriate control and stop valving 27. Alternatively, the steam in the main steam header may be bypassed to the turbine condenser 29 through a steam bypass line 31 having appropriate valving 33. The condensate in condenser 29 is returned to the HRSG through line 35 and by means of a boiler feed pump 37 connected into the line. A portion of the returned water may be taken in line 39 and used in accordance with the present invention.

At the upstream end of the main steam header 25, and according to the present invention, a steam attemperator 41 is positioned in the main steam line in order to control the temperature of the steam to be input into the turbine 12. The steam attemperator is connected to line 39 through appropriate valving including control valve 43. Valve 43 may be a solenoid operated valve under the influence of a control means 45 to be further described. The control means includes several inputs including a turbine shell metal temperature input through electrical line 47 and redundant thermocouple inputs 49 and 51 which yield the steam temperature at a point downstream from the attemperator. The thermocouples 49 and 51 are located far enough downstream from the attemperator to ensure adequate mixing of the steam and water prior to the thermocouple reading. The attemperator 41 is a direct contact spray wherein the water enters the main superheated steam line through three nozzles (not shown) spaced at 120° intervals around the circumference of the attemperator pipe section. Other attemperator configurations may be found suitable and hence the foregoing description does not affect the scope of the present invention. The attemperator, the control valve and the control means to operate the control valve form the basis of a desuperheating station which is the subject of the present invention.

Figure 2:
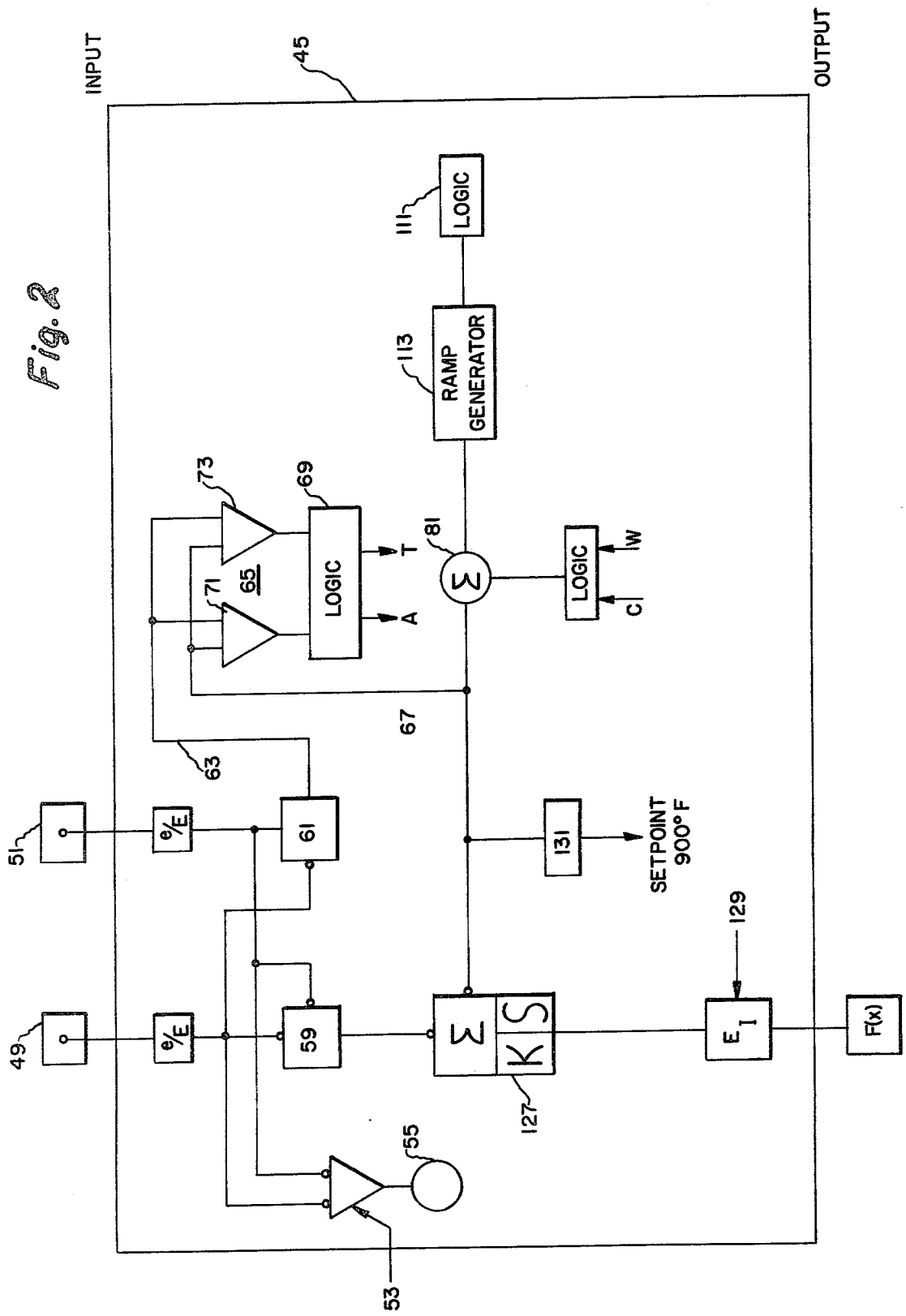
FIG. 2 is a schematic drawing of a control system to be used in implementing the start-up attemperator.

Referring to FIG. 2, the control system utilized as part of the present invention is indicated as having thermocouple inputs 49 and 51 from the main steam line and an electrical signal output F(x) which then is transmitted to the valve 43 which controls the flow of water to the spray attemperator.

The two temperature inputs each pass through redundant signal conditioning circuits e/E which raise the voltage level of the input signals. A portion of each input signal is input into a comparator device 53 which functions in combination with an alarm device 55 to detect a preset difference between the input signals indicative of thermocouple failure. The preset difference might be set, for example, at plus or minus 100° F. Hence, comparator 53 and its associated circuitry provide an initial check on the validity of the redundant input signals.

The remaining portion of the redundant input signals are each input into respective select largest signal circuits 59 and 61. The output signal of circuit 61 on line 63 is input into a difference alarm circuit 65 which also includes a reference input or setpoint on line 67. The difference alarm circuit detects the signal difference between the temperature feedback from the thermocouples (line 63) and a reference or setpoint temperature (line 67). Logic circuitry 69 is included as well as comparator devices 71 and 73. Each comparator device is preset at a selected difference level to provide an output at that level. Comparator 71 will provide an output when the difference is 50° F. whereas comparator 73 will provide an output when the difference is 100° F.

Figure 3:
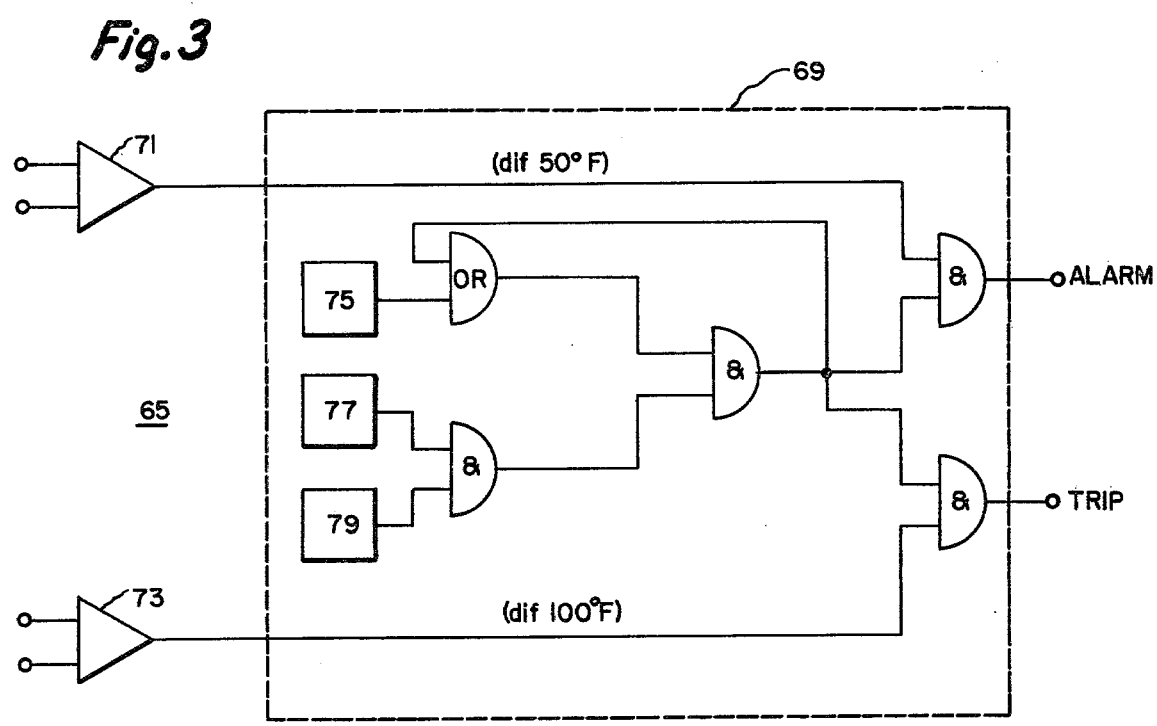
FIG. 3 is a logic circuit drawing showing alarm and trip logic.

Referring to FIG. 3, the logic utilized in logic box 69 is shown. Each comparator 71 and 73 is shown whereas comparator 71 will enunciate at a temperature difference of 50° F. comparator 73 will trip the turbine at a temperature difference of 100° F. Certain pre-conditions must be met to enable this particular logic circuit. The enabling prerequisites are represented in blocks 75, 77 and 79. OR gates are indicated by the word OR whereas AND gates are denoted by the letter &. The permissive shown in block 75 will provide an output signal at a predetermined time after a blocking valve is opened. The blocking valve (not shown) is upstream from the control valve 43 and is basically a shut-off valve for the system redundant with control valve 43. The blocking valve assumes either an open or shut configuration. Before the alarm or trip circuit 65 is activated it is desired that the blocking valve be opened for a predetermined time to ensure adequate opportunity for the spray attemperator to mix with the main steam.

Permissive block 77 assumes that the setpoint ramp, to be described later, is less than 900° F. The setpoint ramp briefly is that temperature at which the attemperator is no longer necessary for start-up conditions. Enabling block 79 assures that the turbine inlet valve is not full closed. Other enabling conditions may be applied to the logic circuit without departing from the scope of the invention. FIG. 3 merely sets forth one example of desired logic steps.

Figure 4:
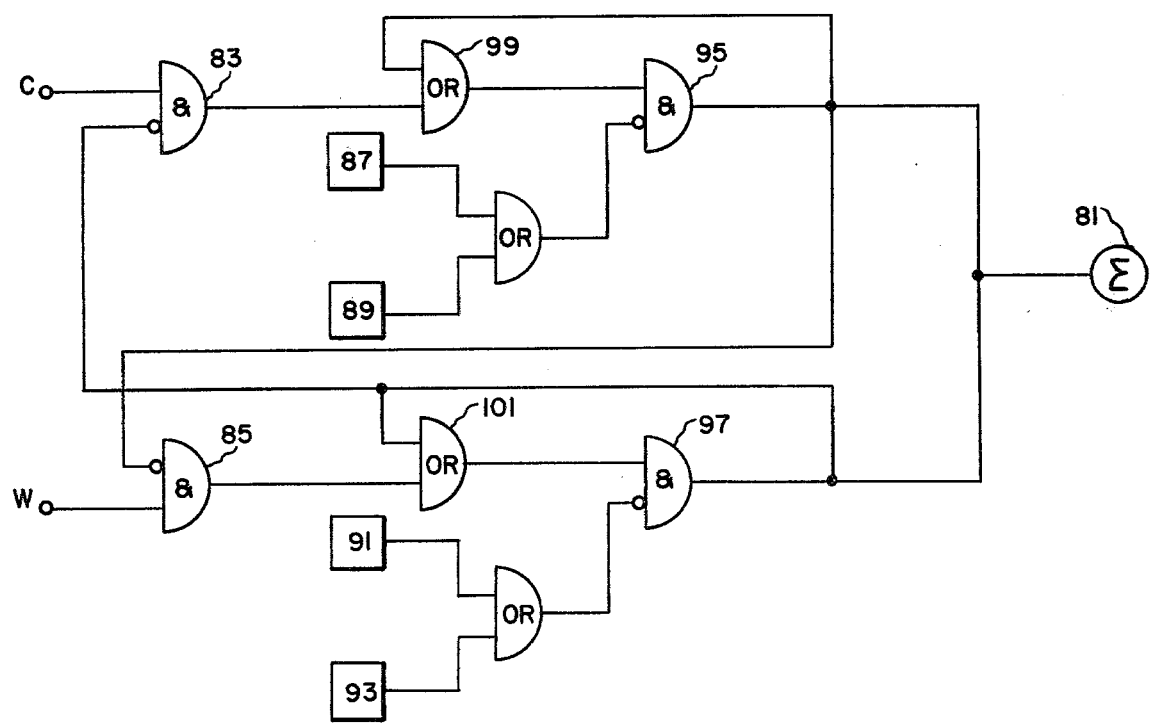
FIG. 4 is a logic circuit drawing showing cold and warm start logic.

Returning to FIG. 2, it can be seen that the setpoint or reference signal in line 67 is derived from summing junction 81. There are two inputs into summing junction 81 including a fixed setpoint based upon initial turbine metal temperature condition and a moving setpoint which follows the start-up of the turbine and the turbine metal shell condition. Referring to the fixed setpoint reference, it must first be determined whether the turbine metal shell temperature is in a cold condition or a warm condition. The cold condition is arbitrarily defined as being in the range of from 80° to 299° F. whereas a warm condition W is referred to as being in the range of from 300° to 549° F. These numbers are for illustration and are not considered limiting in the practice of the present invention. Logic is shown in FIG. 4 which indicates the application of a fixed setpoint to the control circuit based upon shell metal temperature. The shell metal temperature incidentally may be determined automatically or by operator input providing either a setpoint cold (C) or warm (W) input.

Referring to FIG. 4, there is shown a logic circuit including interlocks for differentiating between a cold start and a warm start. If a cold start is indicated the reference setpoint may be set at about 500° F. If a warm start is indicated, the reference setpoint may be set at about 600° F. The reference temperature which is set will determine the point at which the steam temperature attemperator will begin to control the temperature of the steam in the main steam line 25. AND gates 83 and 85 provide an interlock between the cold (C) and warm (W) start inputs such that once a choice is made between the two, a second choice cannot thereafter be inadvertently made without reset. This is indicated by the "not" inputs shown as dots. The "not" inputs indicate with the input signal, for example, a cold start that this is not a warm start and vice versa.

Boxes 87, 89, 91 and 93 are enabling signals for each channel indicating that the system is configured to accept steam either through the bypass line or main steam valves. These inputs are received into AND gates 95 and 97. The output of each of these last mentioned AND gates also prevent a second following signals through the OR gates 99 and 101. The static setpoint from this logic is input into summing junction 81.

Figure 5:
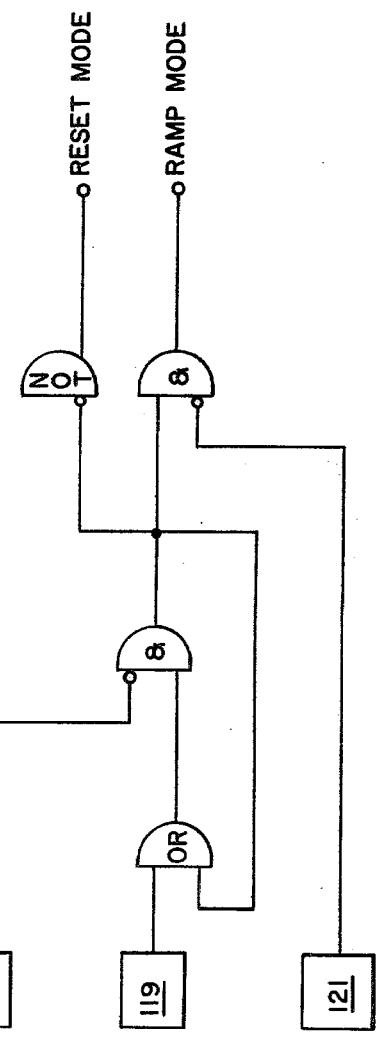
FIG. 5 is a logic circut drawing showing a rate or ramping signal generator.

The tracking setpoint is indicated as originating from logic box 111 and ramp generator 113. The logic box 111 is displayed in FIG. 5. Certain enabling steps precede the actuation of the ramping function and these are represented by boxes 117, 119, and 121. Box 117 indicates that the steam turbine stop valves are not closed; the input from box 119 indicates that the steam turbine is under initial pressure control and box 121 indicates that the steam temperature downstream from the attemperator is not less than 450° F. Viewing the simplified logic diagram, it is clear that the ramp controller will be initiated when the conditions in boxes 117 through 121 are met and reset will occur upon conditions 117 and 119 or if the attemperator output drops below 450° F. The output of logic box 111 is input into the ramp generator 113 which causes an output reference signal which increases the temperature reference setpoint by a predetermined number or degree per hour. In the case of a steam turbine this may be taken as, for example, 200° F. per hour.

The reference setpoint temperature as determined by the summation of the fixed setpoint and the ramp setpoint is sent to a controller module 127. The controller module includes a summing function to derive a controller signal F(x) for the control valve 43. The controller module includes a proportional and integral function and may operate automatically or be controlled manually. The output of the controller is input into a voltage to current converter circuit 129 and then applied to the valve 43 as signal F(x). A high temperature alarm module 131 is also included in the reference signal circuit to indicate when the attemperator setpoint is above 900° F. and hence, should be shutdown as a start-up device.

The operation of the present invention may be reviewed as follows. Referring back to FIG. 1, in a combined cycle power plant the exhaust output of the gas turbine determines the flow and temperature of the steam output of the HRSG. Under start-up conditions the steam must be produced at a temperature to match the starting metal shell temperature of the steam turbine. The output steam temperature of the HRSG may be controlled by altering the output of the gas turbine, but under certain conditions the steam flow thereby produced may be inadequate to roll-off the steam turbine.

The temperature of the HRSG steam output may be controlled by the use of a steam temperature attemperator or desuperheater. This device operates independently of steam flow and is readily implemented. A steam attemperator is incorporated into the main steam header between the superheater output and the steam turbine input. The attemperator is controlled by means of a desired setpoint derived from the shell metal condition of the steam turbine and a feedback thermocouple which is introduced into the main steam line and indicates the actual steam temperature downstream of the steam attemperator.

The controller includes redundant thermocouple temperature inputs the validity of which is checked in a difference alarm circuit. A second difference alarm circuit is provided for checking the actual temperature input with a reference temperature input. The reference temperature input is derived from a fixed setpoint and a ramp setpoint. In order for the attemperator to be activated under normal start-up conditions a preconditioned of either a cold or warm start must be met. After the fixed setpoint logic has been implemented the ramp setpoint logic is also implemented to control the attemperator output up to a reference setpoint of about 900° F. The reference setpoint and the actual temperature are compared in a controller, the output of which is used to control the control valve which passes water into the attemperator.

While there has been shown what is considered to be the preferred embodiment of the invention, it is recognized that other modifications may be made therein, and it is intended to cover in the appended claims all such modifications that fall within the true spirit and scope of the invention.

What is claimed is:

1. A control system for regulating steam temperature in a desuperheating station upstream from a prime mover wherein said desuperheating station includes an attemperator device, valve means for regulating coolant flow to the attemperator and valve positioning means; said control system comprising:
    redundant temperature sensing means providing first and second temperature signals into a preset difference comparator;
    alarm means connected to the output of said preset difference comparator to indicate signal invalidity whenever the first and second temperature signals differ by a preset signal difference;
    select largest logic connected to said first and second temperature signals to provide a feedback temperature signal indicative of the highest steam temperature downstream from said attemperator;
    reference signal generating means including fixed setpoint logic having a status input from said prime mover indicating at least a cold or warm condition and ramp setpoint logic including a rate increase circuit whereby control is extended beyond said fixed setpoint logic and a reference temperature signal is generated; and,
    a valve control module including a summing junction for determining the difference between said feedback temperature signal and said reference temperature signal; the output of said valve control being a valve positioning signal input to said valve positioning means.

2. The control system recited in claim 1 further including high temperature alarm means monitoring said reference signal and providing an output signal indicating whenever a predetermined reference signal limit is reached.

3. The control system recited in claim 1 further comprising a difference alarm circuit for comparing the reference signal to the feedback signal, said difference alarm circuit including:
    first comparator means preset to a lesser signal difference between the reference signal and the feedback signal; and,
    second comparator means preset to a greater signal difference between the reference signal and the feedback signal; said first comparator connected to an alarm circuit; and, said second comparator connected to a trip circuit.

* * * * *